United States Patent [19]

Hoos

[11] Patent Number: 5,303,333
[45] Date of Patent: Apr. 12, 1994

[54] METHOD FOR CONTROLLING THE ACCELERATION AND VELOCITY OF AT LEAST ONE CONTROLLABLE AXIS OF A MACHINE TOOL OR ROBOT

[75] Inventor: Gerd Hoos, Erlangen-Kosbach, Fed. Rep. of Germany

[73] Assignee: Siemens Aktiengesellschaft, Munich, Fed. Rep. of Germany

[21] Appl. No.: 861,911

[22] Filed: Apr. 1, 1992

[30] Foreign Application Priority Data

Apr. 2, 1991 [EP] European Pat. Off. ........ 91105217.3

[51] Int. Cl.$^5$ .............................................. G05B 19/00
[52] U.S. Cl. ........................................ 395/80; 395/91; 395/87; 364/167.01
[58] Field of Search ...................... 364/167.01; 395/80, 395/87, 96, 95, 97, 91

[56] References Cited

U.S. PATENT DOCUMENTS

| | | | |
|---|---|---|---|
| 3,952,238 | 4/1976 | Cutler | 318/571 |
| 4,118,620 | 10/1978 | Wall, Jr. et al. | 219/124.32 |
| 4,677,276 | 6/1987 | Nio et al. | 219/125.12 |
| 4,774,445 | 9/1988 | Penkar | 395/96 |
| 4,947,336 | 8/1990 | Froyd | 364/167.01 |

FOREIGN PATENT DOCUMENTS

| | | |
|---|---|---|
| 0266424 | 5/1988 | European Pat. Off. . |
| 0308513 | 3/1989 | European Pat. Off. . |
| 3434608 | 3/1986 | Fed. Rep. of Germany . |

OTHER PUBLICATIONS

Elektronik, vol. 34, No. 19, Sep. 1986, München, DE, pp. 83–89; Peter F. Orlowski et al.: *Fahrkurvenrechner mit Einplatinen-Computer.*

Primary Examiner—Allen R. MacDonald
Attorney, Agent, or Firm—Kenyon & Kenyon

[57] ABSTRACT

The method enables an axial movement, in particular in the form of a pendulum motion of a numerically controlled axis to be carried out with minimal computational expenditure of time and energy. For this purpose, the pendulum profile is subdivided into the time intervals $(t_{n-1}, t_n)$, in which different motion processes (acceleration, no velocity or constant velocity) take place. In each system clock, it is checked in which time interval $(t_{n-1}, t_n)$, the sum of the already output system clocks $(i_N T)$ lies, so that with the corresponding, previously determined path-time equation $(S_n(t))$, the path segments to be output by the control are calculated and can be output to the operating mechanism of the axis. A change in the tool path feedrate by means of an override setpoint selection can be effected in the fine interpolator by multiplying the system clocks (T) by a constant factor (f).

12 Claims, 2 Drawing Sheets

METHOD FOR CONTROLLING THE ACCELERATION AND VELOCITY OF AT LEAST ONE CONTROLLABLE AXIS OF A MACHINE TOOL OR ROBOT

BACKGROUND OF THE INVENTION

The present invention relates generally to methods for controlling machine tools or robots, and more particularly to a method for controlling the acceleration and velocity (i.e. the feedrate) of at least one controllable axis of a machine tool or robot.

In certain machining processes, which are performed with numerically controlled machine tools or robots, a so-called pendulum or oscillating motion is superimposed on a movement along a trajectory. From robotics, two different solutions for generating this pendulum motion are known. They can be described by the terms "cartesian" and "axis-specific" oscillation, i.e. swinging in pendulum fashion. In the case of "cartesian" oscillation, the cartesian coordinates of the pendulum figure or pendulum curve are specified and transformed by the robot control into a robot-specific coordinate system. It is not a question in this case of actually superimposing a pendulum motion on any path at all, but rather of producing the actual path right from the start in the form of a pendulum motion. Since this method requires a control setpoint selection for all robot axes, it entails a large computing capacity and considerable time.

The axis-specific pendulum movement pertains to an actual superimposition of a pendulum motion on to any movement along a trajectory. The movement along a trajectory is calculated by the numerical control for all axes of a machine tool or a robot, and the pendulum motion is carried out each time from the last axis, that is usually the tool-bearing axis.

One advantage of the "axis-specific" pendulum movement is that a time-consuming conversion of the cartesian pendulum values into axis-specific values, as is required in the case of cartesian pendulum movement, need not be performed. Thus, higher pendulum frequencies can be reached with axis-specific pendulum movement than with cartesian pendulum movement, so that axis-specific pendulum movement still remains relevant technology.

When previous axis-specific pendulum methods are applied, the acceleration and deceleration ramp calculation for generating the motion of the pendulum axis is carried out in the fine interpolator. For that reason, on the one hand, the time needed to calculate the pendulum motion is still relatively long and, on the other hand, the acceleration and the pendulum velocity must be constantly monitored, so that permissible limiting values are not exceeded.

Another disadvantage of the axis-specific pendulum method lies in the fact that a change in the tool path feedrate cannot be taken into consideration by the pendulum motion, which change is supposedly able to be initiated by the user by stipulating an override value, for example, or can be automatically initiated by means of sensors. This is because the calculations with respect to a change in the tool path feedrate are already carried out in the cartesian interpolator, which is connected to the fine interpolator. An override setpoint selection, through which means the tool path feedrate is decelerated, for example, would cause the pendulum figure to become distorted, since the velocity of the pendulum movement does not change with the tool path feed rate.

The present invention is directed to the problem of developing a method for controlling the acceleration and velocity of at least one numerically controllable axis of a machine tool or robot, with which the above-mentioned disadvantages are avoided.

SUMMARY OF THE INVENTION

The present invention solves this problem by determining the path-time equations from a specifiable motion profile and determining the motion segments of the axis to be specified per cycle time of the numerical control from the specific path-time equation in whose time interval lies the sum of the system cycle times output for the axial movement.

The method can be applied to control systems that are provided with analog devices for travel setpoint selection, as well as for numerically controllable axes, whose driving devices are equipped with incremental encoders. In the latter case, the motion segments are specified in increments of an incremental encoder.

In principle, the method is applicable for one-time acceleration-feedrate and velocity-feedrate controlled processes, in which it is important for a specific path of the axial movement to be observed exactly. It is quite advantageously suited for generating a pendulum motion in cases where the axial movement is repeated periodically.

One is able to change the tool path feedrate simply and quite advantageously by applying the method when the sum of the system cycle times output for the axial movement is modified, for example, by specifying an override value or by means of sensor data.

An advantageous application of the method is generating a pendulum motion for welding equipment which is attached to a robot.

DETAILED DESCRIPTION

Figure 1:
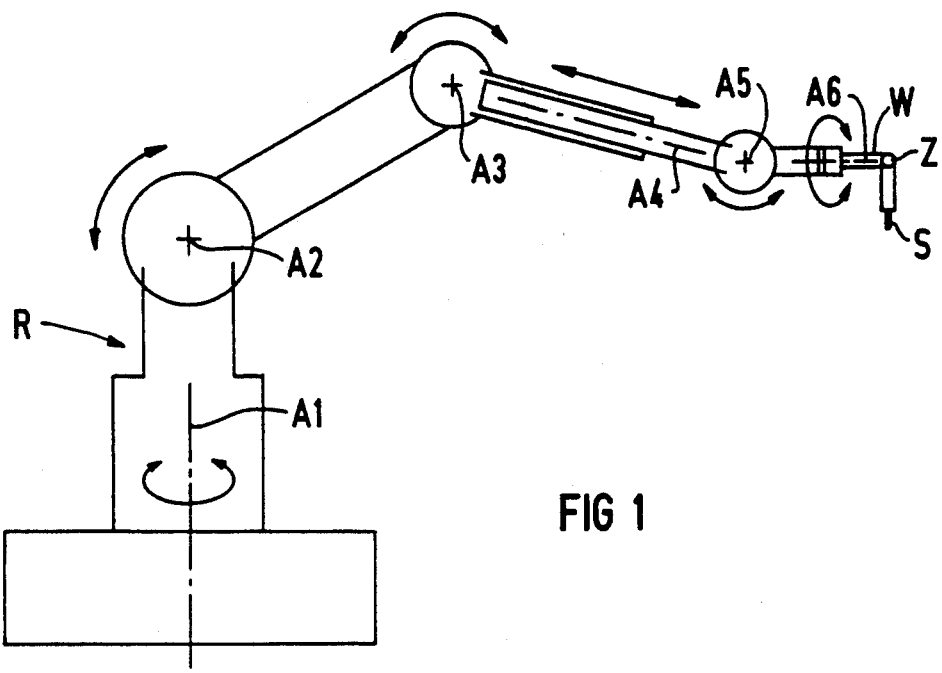
FIG. 1 depicts a hexa-axial robot, i.e. this robot has motion capability in six distinct axes.

FIG. 1 schematically depicts a hexa-axial robot. This robot has motion capability in six unique axes—a vertical axis A1, horizontal axes A2, A3 and A5, a linear axis A4, and a pendulum axis A6. A tool W, which can be a welding torch for example, is secured to the pendulum axis A6. The location (not shown in detail) where the tool W is attached to axis A6 is also marked as a wrist joint. The point Z of the tool W lies in the extension of the wrist joint.

Control data are specified to the robot R by means of a numerical control, which is not depicted, in a way which will allow the central point Z to be moved along a path curve in space. A rotation of the axis A6 makes it possible for a sluing motion of the tool W to be superimposed on this path curve, so that the tip S of the tool W swings out from the middle of the path curve. Consequently, a periodic movement of the axis A6 enables a pendulum motion to be generated for the tip S, which runs centrally to the path curve.

Figure 2:
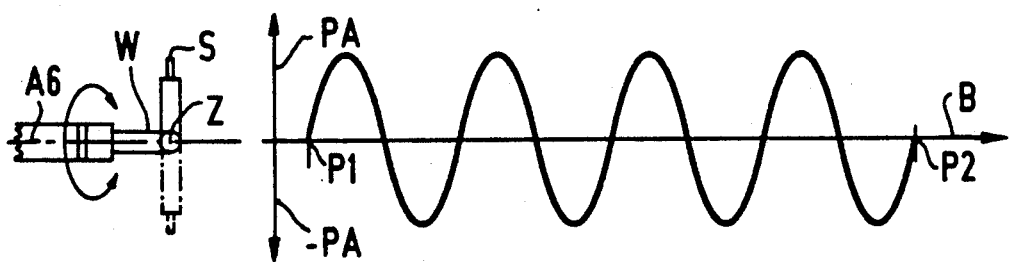
FIG. 2 shows an oscillating motion, also called a pendulum path.

Such a pendulum curve is depicted in FIG. 2. Of the robot R of FIG. 1, only the axis A6 with the tool W, the point Z and the tool tip S are shown in FIG. 2. The point Z is moved through the path curve B specified by the numerical control from point P1 to point P2, while the tool tip S executes a pendulum motion with the oscillating amplitude PA centrally to the path curve B. For the sake of simplicity, the path curve B is depicted as a linear path curve, however, the method can be applied to any path curves whatsoever.

Figure 3:
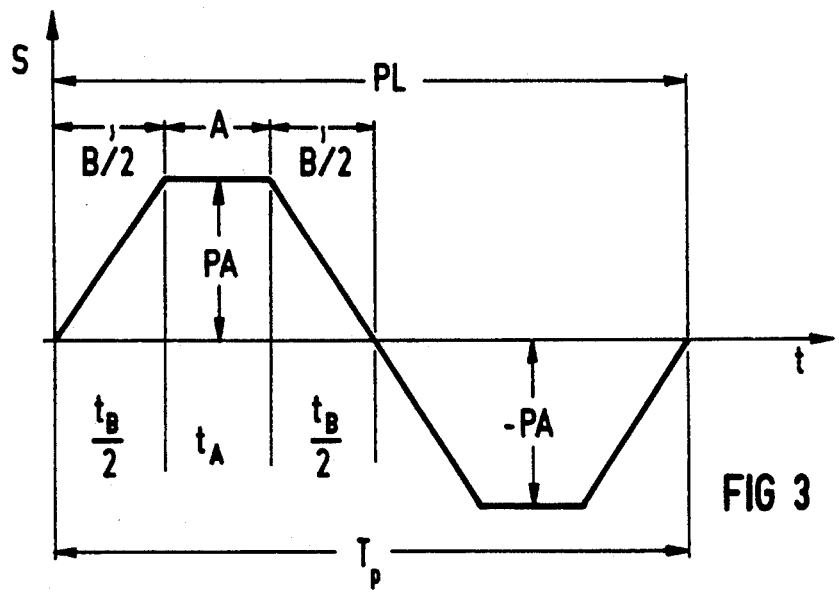
FIG. 3 illustrates a pendulum figure.

FIG. 3 depicts one period of a pendulum motion with the period duration $T_p$, which is composed of the double amplitude duration $t_A$ and the double change duration $t_B$. The corresponding segments which result at a specified tool path feedrate $v_B$ are also marked at the specific times in FIG. 3. The oscillating length PL is supposed to be covered during the period duration $T_p$. The segment B is covered during the change duration $t_B$, so that the segment A is still to be covered during the amplitude duration $t_A$. The pendulum amplitude is again designated by PA.

Conditional on the system clock T of the numerical control, it is useful for the pendulum length PL to assume only integral multiples of the fine-interpolation grid. For the pendulum axis A6 of the robot R, the acceleration $a_{max}$ and the maximum velocity $v_{max}$ are stipulated per machine data. These values must not be exceeded during the pendulum oscillation.

To calculate the pendulum profile "off-line", the user specifies the tool path feedrate $v_B$, the pendulum length PL, the pendulum amplitude PA and the pendulum shape $t_A/t_B$. The relations which can be inferred from the Equations (1) through (6), apply to the pendulum length PL, the pendulum shape PF, the segment B, the time for the change duration $t_B$, the time for the amplitude duration $t_A$, and the time for the pendulum period $T_p$.

$$PL = 2 \cdot (A + B) \tag{1}$$

$$PF = \frac{A}{B} = \frac{t_a}{t_b} \tag{2}$$

$$B = \frac{PL}{2(1 + PF)} \tag{3}$$

$$t_B = \frac{B}{v_B} \tag{4}$$

$$t_A = \frac{B \cdot PF}{v_B} = PF \cdot t_B \tag{5}$$

$$\frac{T_P}{2} = t_A + t_B \tag{6}$$

Since the pendulum figure has the same shape both for the positive as well as for the negative deflection, it suffices to consider just the positive deflection for the additional calculations. To prepare the pendulum profile given a maximum acceleration $a_{max}$, the oscillating velocity $v_1$ and the times $t_1$ to $t_7$ must be defined. This and additional pendulum methods are clarified in the following on the basis of FIGS. 4 and 5.

Figure 4:
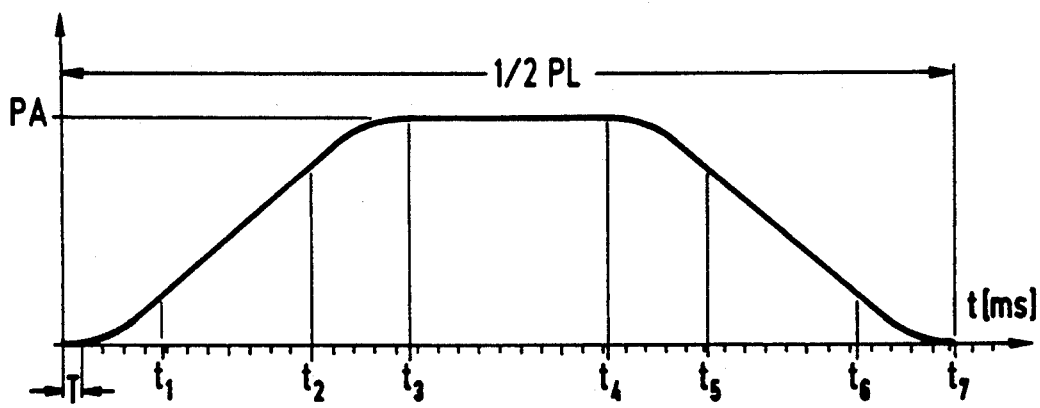
FIG. 4 shows the positive "half wave" of a pendulum figure.
Figure 5:
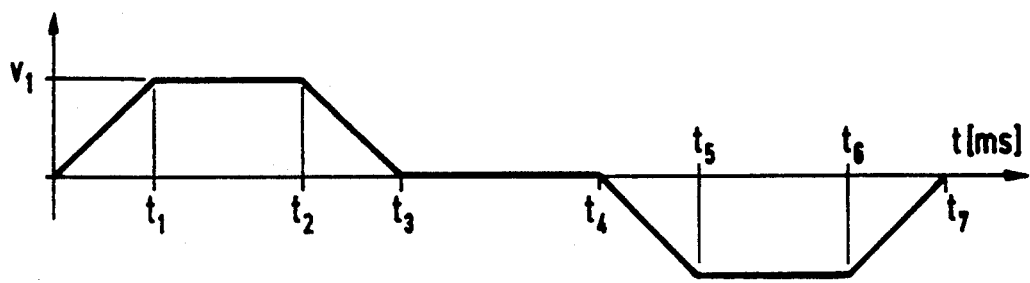
FIG. 5 depicts the velocity versus time diagram for that depicted in FIG. 4.

FIG. 4 shows the positive deflection of the pendulum figure, which is subdivided into the periods of time $t_1$ to $t_7$. The subdivision of the pendulum figure into time intervals greater than $t_{n-1}$ and less than $t_n$ is selected so that the axis A6 is travelled in a specific period of time either with constant acceleration, with a constant velocity or with the velocity $v=0$. The corresponding velocity diagram for FIG. 4 can be extracted from FIG. 5.

In addition to the periods of time $t_1$ to $t_7$, the time axis in FIG. 4 is also subdivided into the system clock grid of the system clock T. It can be recognized that, as a rule, the instants $t_1$ to $t_6$ do not coincide with a cycle instant $i_N T$.

To generate the pendulum motion, first the pendulum velocity $v_1$ is calculated according to equation (7):

$$v_1 = \frac{t_B}{4} \cdot a_{max} \pm \sqrt{\frac{t_b^2}{16} \cdot a_{max}^2 - PA \cdot a_{max}} \tag{7}$$

If from the two possible values, one selects the smaller value for the oscillating velocity, it is then ensured in this manner that the maximum permissible velocity will not be exceeded.

Then for each period of time 0 to $t_1$, $t_1$ to $t_2$, ..., $t_6$ to $t_7$, the path-time equations are determined prior to and specified to the numerical control. The following equations result for the pendulum profile of FIG. 4:

$$S_1(t) = \frac{1}{2} a t^2 \text{ where } t_0 - i_N T \leq t < t_1 \tag{8}$$

$$S_2(t) = S_1 + V_1(t - t_1) \text{ where } t_1 - i_N T \leq t < t_2 \tag{9}$$

$$S_3(t) = S_2 + V_1(t - t_2) - \frac{1}{2} a (t - t_2)^2 \text{ where} \tag{10}$$

$$t_2 - i_N T \leq t < t_3$$

$$S_4(t) = PA \text{ where } t_3 - i_N T \leq t < t_4 \tag{11}$$

$$S_5(t) = S_4 - \frac{1}{2} a (t - t_4)^2 \text{ where } t_4 - i_N T \leq t < t_5 \tag{12}$$

$$S_6(t) = S_4 - (S_1 + V_1(t - t_5)) \text{ where} \tag{13}$$

$$t_5 - i_N T \leq t < t_6$$

$$S_7(t) = S_4 - \left( S_1 + V_1(t - t_5) - \frac{1}{2} a (t - t_6)^2 \right) \tag{14}$$

$$\text{where } t_6 - i_N T \leq t < t_7$$

During the interpolation process, the sum of the previously output interpolation cycles or fine-interpolation cycles is formulated ($i_N = \Sigma i$). Also, it is checked in each case, in which period of time ($t_{n-1} \leq i_N \times T < t_n$) the sum of the previously output cycle times falls. From the path-time equation appertaining to this period of time, the path segment to be output to the axis A6, that is the number of increments in the case of an incremental travel setpoint selection, is calculated and output.

An override specified by the user or by a sensor is able to be considered in a simple manner by means of the fine interpolator. To this end, in each case the new sum of the interpolation cycles $i_N$ is determined from the sum of the preceding interpolation cycles $i_{N-1}$ and of the override value or the override factor f according to Equation (15).

$$i_N = i_{N-1} + f \text{ where } f = 0 \ldots 1 \tag{15}$$

Thus, the sum of the total cycle times output previously amounts to:

$$t_N = i_N T \quad (16)$$

where T is the cycle-time constant of the fine interpolator.

The oscillating travel setpoint selection in each case to the axis A6 is then able to be determined from the difference between the previously covered path $S(t_{n-1})$ and the total path $S(t_N)$ to be covered at the instant $t_N$:

$$\Delta S = S(t_N) - S(t_N - 1) \quad (17)$$

Thus, in the case of an override specification of $1 > f > 0$, a change in the pendulum velocity is attained simply, because the normally rigid system cycle time is "manipulated" as a function of the sum of the interpolation cycles output in each case, so that the time intervals $t_{n-1} < t_n$ are extended to an extent.

For the sake of completeness, it is also mentioned that the pendulum length PL can also equal zero, so that the pendulum motion can be carried out at any spatial point.

What is claimed is:

1. A method for performing an axial movement of a numerically controlled machine tool by controlling an acceleration and velocity of a controllable axis (A6) of the numerically controlled machine tool, comprising the steps of:
   a) specifying a motion profile;
   b) determining a plurality of path-time equations corresponding to a plurality of specifiable time intervals from a motion profile;
   c) outputting a system cycle time (T) to a numerical controller for the axial movement;
   d) calculating a sum ($\Sigma i = i_N$) of all previously output system cycle times;
   e) determining a motion segment for said controllable axis (A6) from a corresponding path-time equation corresponding to a particular time interval ($t_0, t_1$) in which said sum ($i_N T$) occurs;
   f) controlling said controllable axis according to said motion segment; and
   g) repeating steps b) through f) until a motion segment has been calculated for each time interval.

2. The method according to claim 1, further comprising the step of specifying the plurality of motion segments in a plurality of increments of an incremental encoder.

3. The method according to claim 2, further comprising the step of modifying said sum of the system cycle times ($i_N T$) output for the axial movement.

4. The method according to claim 3, wherein said numerically controlled machine tool comprises a welding tool attached to a robot, and said axial movement is a pendulum motion.

5. The method according to claim 2, wherein said numerically controlled machine tool comprises a welding tool attached to a robot, and said axial movement is a pendulum motion.

6. The method according to claim 1, further comprising the step of performing a periodic repetition of the axial movement.

7. The method according to claim 6, further comprising the step of modifying said sum of the system cycle times ($i_N T$) output for the axial movement.

8. The method according to claim 7, wherein said numerically controlled machine tool comprises a welding tool attached to a robot, and said axial movement is a pendulum motion.

9. The method according to claim 6, wherein said numerically controlled machine tool comprises a welding tool attached to a robot, and said axial movement is a pendulum motion.

10. The method according to claim 1, further comprising the step of modifying said sum of the system cycle times ($i_N T$) output for the axial movement.

11. The method according to claim 10, wherein said numerically controlled machine tool comprises a welding tool attached to a robot, and said axial movement is a pendulum motion.

12. The method according to claim 1, wherein said numerically controlled machine tool comprises a welding tool attached to a robot, and said axial movement is a pendulum motion.

* * * * *